Aug. 10, 1965   R. E. HART   3,199,454
PREDATORY FISH CONTROL MEANS
Filed Nov. 6, 1963   2 Sheets-Sheet 1

INVENTOR.
RICHARD E. HART
BY
AGENT

Aug. 10, 1965            R. E. HART            3,199,454
PREDATORY FISH CONTROL MEANS
Filed Nov. 6, 1963            2 Sheets-Sheet 2
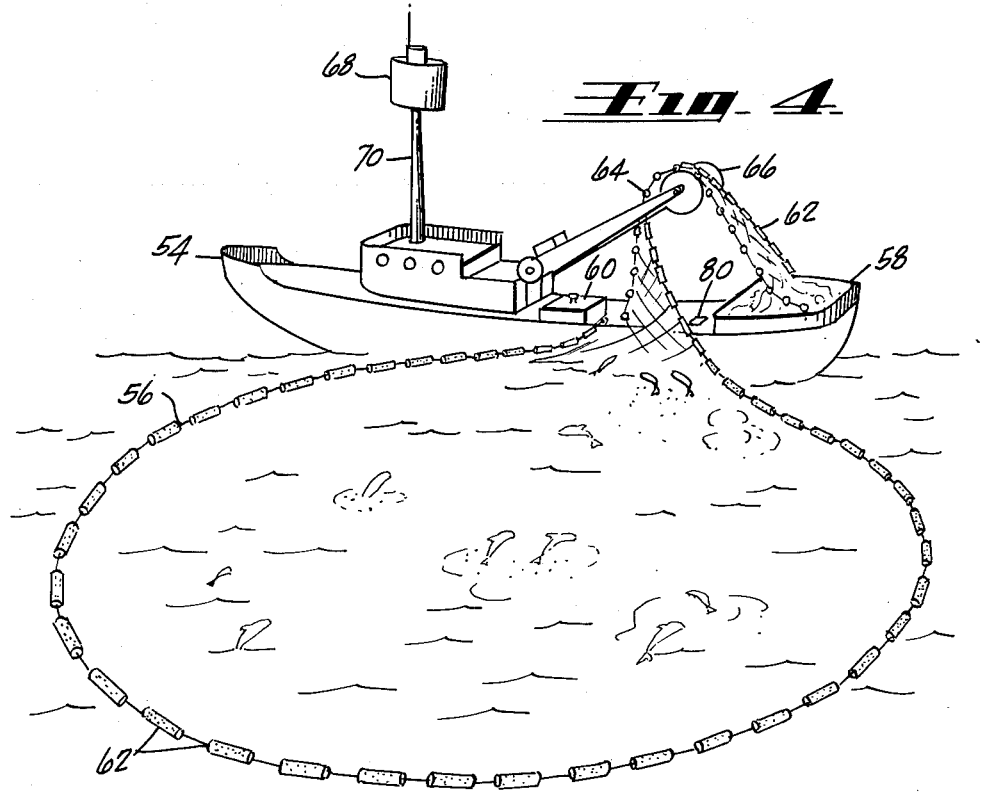
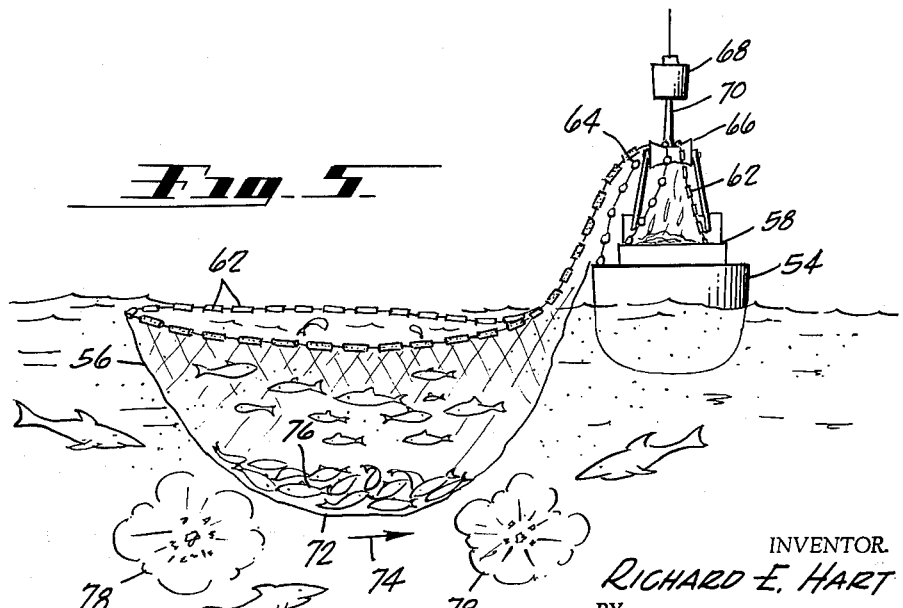
INVENTOR.
RICHARD E. HART
BY
AGENT

# United States Patent Office 3,199,454
Patented Aug. 10, 1965

3,199,454
PREDATORY FISH CONTROL MEANS
Richard E. Hart, Costa Mesa, Calif., assignor to Douglas
Aircraft Company, Inc., Santa Monica, Calif.
Filed Nov. 6, 1963, Ser. No. 321,840
6 Claims. (Cl. 102—39)

My invention relates generally to means for controlling predatory marine life such as sharks in various situations including protection of netted fish and the net during fishing operations, warding off of sharks and the like from attacking a person or persons floating in the ocean during rescue operations thereof, and other operations of a generally analogous nature. In particular, my invention relates to a novel and useful device for producing a repellent and deterrent barrier to predatory fish at any desired position and time within a fluid medium such as the ocean.

Predatory fishes, especially sharks, present quite a problem in ocean fishing where a net is utilized to catch fish such as tuna. The tuna clippers carry extremely large nets which are used to capture a school of tuna when sighted or found. Purse seines are normally used and are quite large, being of the order of 400 fathoms in length and 45 fathoms in depth. When a school of tuna is found, a power skiff is put out pulling one end of the large net or seine from the aft platform of the tuna clipper bringing the net before and across the path of the tuna school. The clipper then circles and brings its end of the net together with the end on the skiff. The upper edge of the net is, of course, supported by floats and the lower edge is weighted by steel rings through which the purse line passes. When the ends of the net are brought together, the ends of the purse line are wound up by a power winch on the clipper to draw together the bottom or lower edge of the net and thus trap the tuna therein.

After the bottom of the purse net is closed and brought on board of the clipper, one end of the net is tied down and the other end is brought up and passed over a boom-mounted block or drum which is rotatably driven to take up the net that is then stacked on the aft platform. The purse line, of course, is detached from the winch as required. The net size is thus progressively reduced and formed into a relatively small bag or sack from which the tuna is scooped and deposited in the fish wells of the clipper by a process commonly referred to as brailing.

It is in the process of taking up the net, especially during pickup of the last 100 fathoms of the net, that the largest percentage of shark attacks occur. Very few attacks occur after the tuna are brought to the bag. Also, there is no warning as to when the attacks will occur; the first indication comes when large net holes caused by the sharks appear as the net is picked up via the power block or drum. Thus, at times, not only is a large part of the tuna catch lost, the destruction to the net may necessitate patching thereof for periods of hours to days.

The net holes caused by the sharks, and therefore their attacks on the tuna, occur approximately 80 percent of the time in the "rolling strip" of the net. The net is formed of a large number of horizontal or longitudinal strips which are normally 3½ fathoms wide or deep. As the net is being picked up, the tuna which became gilled or caught in the net meshes at or near the rolling strip and those that are rolled therein by the upward movement of the net, appear to induce the sharks to attack mostly at that time.

The rolling strip is seven strips down from the upper edge of the net, so that the shark attacks usually occur at a depth of approximately 21 to 24½ fathoms. Actually, the depth is somewhat less due to the curvature of the net as it is being taken up. Even so, this order of depth renders it very difficult to provide any effective measures, if at all, which would prevent the shark attacks. A similar problem of depth is present in finding effective measures to prevent shark attacks on a person or persons floating on the surface of the water during rescue operations since sharks normally approach anywhere from the surface of the ocean to depths of about 10 feet and initiate their attack effort on the victims from a depth of 3 to 5 feet.

It is an object of my invention to provide means which can be used effectively to repel and deter predatory fish such as sharks from attacking netted fish at a considerable depth in the ocean, or a person or persons floating on the surface thereof.

Another object of the invention is to provide means capable of producing a barrier at any selected depth, and which barrier is an effective repellent and deterrent to predatory fish such as sharks.

A further object of the invention is to provide a relatively small and light device which can be controlled in sink rate in a fluid medium and is capable of producing a comparatively large barrier at a desired depth.

A still further object of this invention is to provide a relatively simple, highly effective and substantially self-contained means for producing a large volume, cloud formation barrier at a desired depth in the ocean whereby predatory fishes are actively repelled from it by the characteristic nature of the barrier.

Briefly, and in general terms, the foregoing and other objects are preferably accomplished by providing a pyrotechnic cartridge containing therein a quantity of repellent material and an explosive charge having one end of a predetermined length of fuse connected thereto, the cartridge including a ballast of a predetermined shape and weight at one end to govern the sink rate of the cartridge in a fluid medium, and a primer or initiator assembly (fusee unit) connecting with the other end of the fuse at another end of the cartridge. By igniting the primer and deploying the cartridge to a point as desired on the ocean, the cartridge will sink at a predetermined rate for a time duration established by the length of fuse therein before detonation thereof at a proper depth occurs. The explosion then disperses the repellent substance in a large cloud formation to provide a barrier to predatory fish by virtue of the chemical and physical characteristics of the barrier.

The repellent material in the cartridge is a chemical composition comprising a mixture of variable proportions preferably of a water soluble fluorescent substance, fine sand and a toxic or highly disagreeable ingredient to predatory fish. The latter ingredient is preferably copper sulfate which, however, can be entirely omitted from the chemical composition since it was discovered that the fine sand, in certain uses of the cartridge, is sufficiently irritating in the barrier to predatory fish such as sharks to permit the omission of the toxic ingredient from the chemical composition. Instead of copper sulfate, cresote may be used forming a colloidal solution or mixture with the other ingredients.

My invention will be more fully understood, and other objects and features thereof will become apparent from the following detailed description of an illustrative embodiment of the invention, to be taken in connection with the attached drawings, in which:

FIGURE 4 is a simplified perspective view taken generally from above the water depicting the use of the cartridge in fishing operations; and FIGURE 5 is a perspective view taken from another direction and including a portion underwater to illustrate the use of the cartridge in fishing operations.

Figure 1:
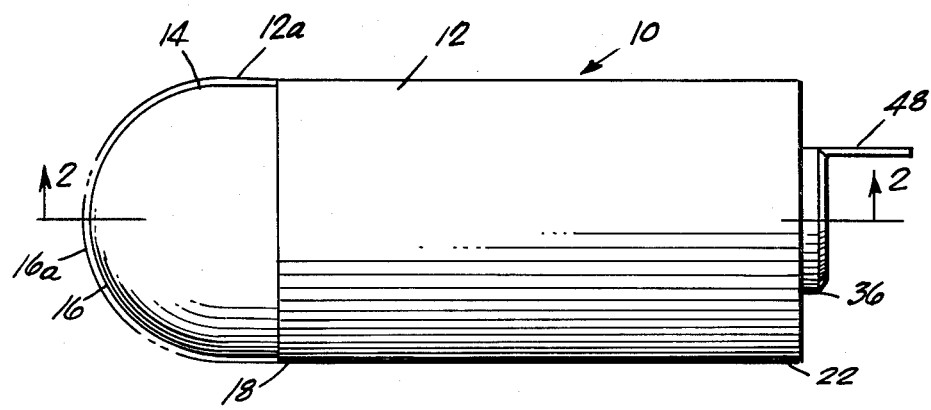
FIGURE 1 is a side view of an illustrative embodiment of my invention.

FIGURE 1 is a side view of an illustrative embodiment of my invention. A substantially symmetrical cartridge 10 which is generally cylindrical in shape is shown. The cartridge 10 has an overall length of, for example, approximately 5⅝ inches, and has a diameter of approximately 2½ inches. A tubular casing 12 forms the main body of the cartridge 10. The casing 12 is preferably a cylindrical, cardboard tubing (or equivalent) which is approximately 4 inches in length, has a wall thickness of about 0.5 inch and an outside diameter of approximately 2⅛ inches which is, of course, the main diameter of the cartridge 10.

A ballast 14 which is cylindrically shaped and having a hemispherical end 16, is attached to one end 18 of the tubular casing 12 such that the casing 12 is closed by the ballast 14 at that end and the hemispherical end 16 forms a streamline front end for the cartridge 10. The ballast 14 is preferably fabricated from a cement substance which may be similar to the trade name sealers "Pour Rock" or "Hydrocal." A mixture of fine sand and the cement substance may be used if the total weight of the ballast 14 is to exceed, for example, .4 lb.

It is desirable that the cement substance used to fabricate the ballast 14 have a specific gravity of at least 2.80 in order that the size of the ballast 14 be kept reasonably small. While the ballast 14 could, of course, be greatly reduced in size if a metallic substance were used, it would be more difficult and exepnsive to produce a streamline hemispherical end of suitable diameter to close the end 18 of the tubular casing 12.

A ballast 14 fabricated from a suitable cement substance can also be more easily shattered when mounted in close proximity to an explosive charge and is generally safer than a metallic ballast under such circumstances. A metallic ballast 14 having a hemispherical end, however, can be made centrally hollow and this may be desirable for certain applications where it is necessary to provide greater space within the cartridge 10 without increasing its overall size.

A casing 12a having a closed left end such as a hemispherical end 16a indicated in phantom lines, may be used instead of the tubular casing 12. The casing 12a is preferably made of plastic material extruded in the shape indicated, and the ballast 14 is produced by pouring a suitable amount of cement substance into the hemispherical end 16a of the casing 12a and allowed the harden therein.

Figure 2:
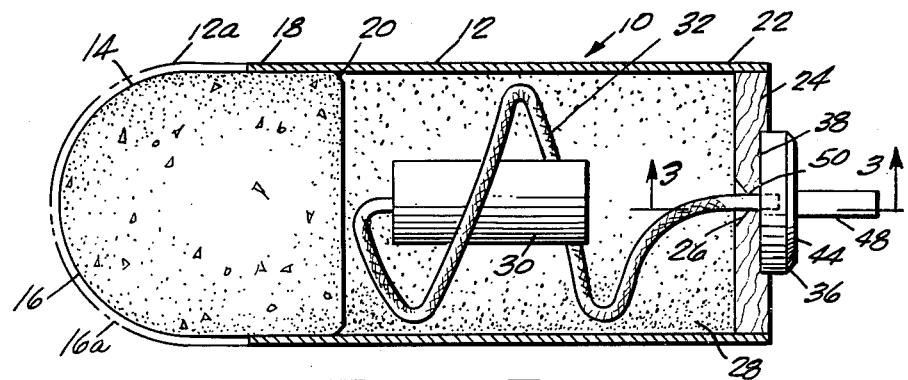
FIGURE 2 is a central, longitudinal sectional view of the predatory fish control cartridge taken along the line 2—2 as indicated in FIGURE 1.

FIGURE 2 is a central, longitudinal sectional view of the cartridge 10 taken along the line 2—2 as indicated in FIGURE 1. The cylindrically shaped ballast 14 has a beveled peripheral edge 20 at the inner end which is swage fitted into the end 18 of the casing 12. The beveled edge 20 makes, for example, an angle of 30 degrees with with the longitudinal axis of the cylindrical shaped ballast 14, and is approximately ³⁄₃₂ inch wide longitudinally. The ballast 14 is approximately 2³⁄₁₆ inches long, having a 1¹⁄₃₂ inch spherical radius for its hemispherical end 16. It should be noted that the ballast 14 can be varied in material, shape and size as required. In fact, a ballast 14 fabricated from a cement substance has more bulk than one made of a metallic substance, for a hemispherical end of a predetermined radius, which would permit easier reduction in size and /or machining to alter the weight and shape of the ballast to control the sink rate of the cartridge 10 in a fluid medium as desired for various purposes.

The inner end of the ballast 14 is swage fitted approximately ¾ inch longitudinally into the left end 18 of the casing 12 as indicated in FIGURE 2. The ballast 14 is somewhat loosely secured to the end of the casing by immersing the cartridge 10, when fully completed, in ordinary molten paraffin. The other, right end 22 of the tubular casing 12 is closed by a cap or plug 24 which is preferably a ¼ inch thick, hard marine plywood disc having a port 26 provided centrally therein.

A quantity of chemical composition 28 and an explosive charge 30 having a connecting fuse 32 are contained within the casing 12 in the space between the ballast 14 and the plug 24. The chemical composition 28 is packed about the explosive charge 30 and its fuse 32 which are preferably positioned and arranged approximately as shown in FIGURE 2. The chemical composition 28 comprises a mixture of different materials which can be varied in type and/or relative amounts as desired or required for different uses of the cartridge 10. The type and/or amount of explosive charge 30 and the type and/or length of the fuse 32 can also be varied as desired or required for different uses of the cartridge 10.

The cartridge 10 is designed to control predatory marine life such as sharks, barracuda, etc. It can be used effectively during pickup of a net in ocean fishing operations to reduce or eliminate the loss of netted fish and the destruction of large portions of the net by sharks. The cartridge 10 can also be used to ward off or repel a shark attack on a person or persons floating or swimming in the ocean following the sinking of a disabled aircraft or ship, for example, while rescue operations are under way. The chemical composition 28 is preferably different in mixture porportions for use in fishing operations than in rescue operation. Similarly, the composition of the ballast 14, the quantity of explosive charge 30 and the length of its fuse 32 are also normally different for these operations.

For use in predatory fish control, the chemical composition 28 preferably comprises a mixture of a water soluble fluorescent substance to provide a visible fluorescent substance when dissolved in water, a finely divided inorganic solid material to serve as a carrier and dispersing agent and to provide an opaque-forming as well as a respiratory-irritating substance carrying barrier, and a toxic or disagreeable substance to predatory fish. The chemical composition 28, for example, preferably comprises a mixture of sodium fluorescein ($Na_2C_{20}H_{12}O_5$), fine sand or silicon dioxide ($SiO_2$) and finely powdered copper sulphate ($CuSO_4 + 5H_2O$). These substances are all intimately and thoroughly mixed together to form the chemical composition 28. Cresosote,

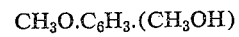

may be used in place of the copper sulfate, and is intimately mixed with the other ingredients to form a firm mass.

The explosive charge 30 is, for example, a perchlorate, black aluminum flash powder and the fuse 32 is preferably a black powder trail fuse which is moisture proof. The fuse 32 is approximately ⅛ inch in diameter, for example, and burns at a predetermined rate. The explosive charge 30 is also contained in a moisture proof container of relatively thin plastic or suitably treated paper. Although considerable observations were made and extensive tests were conducted aboard the M.S. Paramount in the Central American fishery (San Benedicto) and aboard the M.S. Antoinette "B" in the central and South American fisheries, which established the effectiveness and usefulness of the cartridge 10 and its preferred chemical composition 28, it was not determined just to what extent the chemical characteristics of the explosive perchlorate charge 30, on detonation and dispersal of the chemical composition 28, added to the chemical repellent nature of the composition 28. It is believed that the exploded perchlorate charge 30 serves primarily to disperse the chemical composition 28 in a cloud formation.

It was discovered that the fine sand or silica ingredient of the chemical composition 28 appeared to have a significantly irritating effect on predatory fish such as sharks. In fact, where there is undue concern that the copper sulphate, which is a limited poison, may possibly cause contamination or damage to netted fish from injection of the copper sulphate into the ocean close to the fish, it is possible to omit the copper sulphate, or other toxic ingredient that might be used instead, from the chemical composition 28 without greatly reducing the repellent or deterrent effect of the cloud formation in the water resulting from explosion of the cartridge 10. Of course, there is little fear of contamination when creosote is used in place of the copper sulfate since creosote is commonly used in the preservation of wood and smoked meat.

Actually, fish contamination due to the dispersal of some copper sulphate in the ocean is essentially nil through use of a pyrotechnic cartridge as compared to the injection of a sulphate solution by means of a hose to a point in the ocean near the surface and the ship where the net is being picked up. The cartridge 10 produces a cloud formation at a depth and distance which will not be picked up and collected by the net as it is being raised, and any sulphate that might be encountered by the netted fish or net is washed away by the time that the fish or net is brought up and into the ship.

Three examples listing the ingredients and various proportions by volume of satisfactory mixtures of the chemical composition 28 for use in fishing operations are given below. A fairly wide, permissible variation in proportions of ingredients is indicated.

*Example A*

| Ingredient | Parts by Volume | | |
|---|---|---|---|
| Sodium fluorescein | 2 | 2 | 3 |
| Fine sand (silica) | 6 | 5 | 4 |
| Finely powdered copper sulfate | 2 | 3 | 3 |
| | 10 | 10 | 10 |

*Example B*

| Ingredient | Parts by Volume | | |
|---|---|---|---|
| Sodium fluorescein | 2 | 3 | 4 |
| Find sand (silica) | 8 | 7 | 6 |
| | 10 | 10 | 10 |

*Example C*

| Ingredient | Parts by Volume | | |
|---|---|---|---|
| Sodium fluorescein | 2 | 1 | 1 |
| Fine sand (silica) | 5 | 5 | 4 |
| Creosote | 3 | 4 | 5 |
| | 10 | 10 | 10 |

The sodium flourescein is mainly provided in the chemical composition 28 to produce a visible fluorescence when it is dissolved in water, and can be omitted from the chemical composition if desired. However, its fluorescence is believed to help deter predatory fish from entering such resultant barriers. While the toxic or disagreeable ingredient in the chemical composition 28 is preferably copper sulfate or creosote, other repellent ingredients such as formic acid or potassium phenyl acetate which are both water soluble may be used in suitable mixtures.

Where the cartridge 10 is used in fishing operations, the explosive charge 30 can consist of 120+8 grains of the perchlorate black aluminum flash powder in the illustrative cartridge 10 described above. With a ballast 14 weighing approximately .4 lb., and the cartridge properly filled with the chemical composition 28, a fuse 32 having a burn time of 28+2 seconds is preferably employed.

The illustrative cartridge 10 would then have a sink rate of approximately 5 feet per second, and the cartridge 10 will therefore be exploded at a depth of about 140 feet or about 23 fathoms which is at rolling strip depth. It should be noted that the end of the fuse 32 is lit by a connecting primer or initiator assembly (fusee unit) which is described below, that has a burn time of no greater than, for example, 2+½ seconds. Thus, approximately two seconds are available in which to aim and throw the activated cartridge 10 into the ocean, and have the cartridge 10 start sinking when the fuse 32 begins to burn.

In a life saving situation, as might occur during rescue operations of a person or persons floating or swimming in the ocean and subject to attack by sharks, the toxic or disagreeable ingredient in a mixture of the chemical composition 28 is considerably increased in proportion. An example indicating the ingredients and various proportions by volume of satisfactory mixtures of the chemical composition 28 for use in rescue operations are given below. A fairly wide, permissible variation in proportions of ingredients is also indicated.

*Example D*

| Ingredient | Parts by Volume | | |
|---|---|---|---|
| Copper sulfate | 6 | 6 | 7 |
| Fine sand | 2 | 3 | 2 |
| Sodium fluorescein | 2 | 1 | 1 |
| | 10 | 10 | 10 |

The explosive charge 30 in a cartridge 10 which is used for rescue operations, is reduced approximately in half to, for example, 60+4 grains of the perchlorate black aluminum flash powder. This will reduce the hazard or danger of the explosion to nearby persons. At the same time, it is desirable that the sink rate of the cartridge 10 be reduced, and the fuse 32 be shortened so that detonation of the cartridge 10 occurs at about a depth about 8 to 10 feet. This is to provide adequate protection from sharks which may approach from depths of about 10 feet and initiate their attack effort from a depth of 3 to 5 feet.

When the cartridge 10 is to be used in rescue operations, the ballast 14 is preferably fabricated from a plastic (polyurethane) substance or plaster of Paris, for example, to reduce the sink rate to approximately 3 feet per second. If the cartridge 10 is to be deployed from a helicopter at a height of approximately 200 feet, a fall time of approximately 3½ seconds is expended before impact with the surface of the water. With about 2 seconds primer or fusee burn time (for aiming and throwing) and a cartridge sink rate of 3 feet per second, or 3 seconds to reach a depth of 9 feet, the total time expended from ignition of a cartridge 10 to detonation thereof will be about 8½ seconds. This amount of time provides reasonable safety for handling and deploying the cartridge 10. However, this amount of time should not be decreased very much, so that an unduly heavy ballast 14 should be avoided with cartridges which are used in rescue operations.

The fuse 32 is connected on one end to the explosive charge 30, and the other end is passed through the port 26 and into an aligned hole 34 in a primer or initiator assembly or fusee unit 36 which is attached to plug 24 in a spot-faced circular recess 38 thereof, as shown in FIGURE 2. The initiator assembly or fusee unit 36 includes a basic disc 40 having the hole 34 centrally located therein, a primer compound 42 filling a countersunk portion 44 at the outer part of hole 34, and an adhesive cover 46 for the compound 40. The outer edge of the disc 40 is beveled, and the adhesive cover 46 covers the entire end face of the disc 40 including the beveled surface so that the primer compound 42 is fully sealed. The adhesive cover 46 has a non-adhesive tab 48 which can be easily grasped to peel the cover 46 off the outer face of the fusee unit 36 to uncover the primer compound 42. The primer compound 42 is similar to that used in fuses and is not easily blown out.

Figure 3:
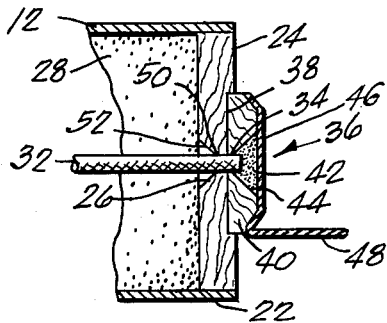
FIGURE 3 is a fragmentary, sectional view of an end of the cartridge taken along line 3—3 as indicated in FIGURE 2.

FIGURE 3 is a sectional view of the plug 24 and attached fusee unit 36 as taken along the line 3—3 indicated in FIGURE 2. As can be seen from FIGURE 3, the port 26 is a hole 50 having an inner, countersunk portion 52. The outer end of the hole 50 is spot-faced around it to provide the recess 38 which receives the inner end of the disc 40. The inner end of the disc 40 may be glued or otherwise secured in the recess 38. The end plug 24 may be made of plastic in the form of an end cap with a central portion integrally formed therein in the shape of the initiator assembly or fusee unit 36, with a countersunk portion to be filled with the primer compound.

The end of the fuse 32 is inserted into the port 26 and through the hole 34 such that it is located within 1/8 inch of the outer face surface of the disc 40. Molten primer compound is then poured into the countersunk portion 44 until it covers the top of the fuse 32 and is substantially level with the outer face surface of the disc 40. After solidifying, the primer compound 42 is completely covered by the adhesive cover 46. The fuse 32, the explosive charge 30 and the points connecting with the explosive charge 30, port 26 and the initiator assembly or fusee unit 36 are suitably sealed with sodium silicate (or similar substance) to be moisture proof.

To assemble the cartridge 10, the plug 24 with attached fusee unit 36, fuse 32 and the connecting explosive charge 30 is swage fitted to the right end 22 of casing 12 and sealed with a nonsoluble (in water) glue. The casing 12 is then gradually packed with the chemical composition 28 while the fuse 32 and the explosive charge 30 are carefully arranged and positioned. After packing the casing 12 to within 3/4 inch of the left end 18 of the casing 12, the ballast 14 is swage fitted into the left end 18 solidly packing the chemical composition 28 in the casing 12. The entire cartridge 10 except for the adhesive cover 46 can then be painted a bright color and, finally, the cartridge 10 is sealed against a moisture or fluid environment by immersing it in ordinary paraffin. A paraffin coating of, for example, at least 3/32 inch is necessary to ensure that the cartridge 10 is adequately moisture proofed.

FIGURE 4 is a simplified perspective view depicting the use of the cartridge 10 in fishing operations. The use of the cartridge 10 in fishing operations is illustrated since its use in rescue operations is relatively simple and consists of generally deploying the units at a radius between approximately 10 to 15 feet from a floating person, in a circular scatter pattern. Each cartridge 10 is ignited by peeling off the adhesive cover 46 and scratching the surface of the primer compound 42 with the head of a primer striker (not shown) which is similar to an ordinary match having a head of a particular chemical substance that reacts with the primer compound 42 to ignite the latter. Detonation of each cartridge at the predetermined depth produces a cloud formation of approximately 24 cubic feet upon initial explosion, and these form a repellent barrier to predatory fish around the floating person. The cloud formations spread slowly and are not dispersed or washed away very easily because of the dye-like and colloidal characteristics of the ingredients of the chemical composition 28.

A tuna clipper 54 is shown in FIGURE 4 in the process of taking up and re-stacking part of a purse net 56 on a rotatable aft platform 58 of the clipper 54. The remainder of the net 56 has been formed into a closed circle, the upper edge of the net 56 being supported by floats 62. The bottom of the net 56 had been previously drawn shut by means of a winch 60 which was used to wind up the purse line that passes through steel rings 64 attached to the lower edge of the net 56. As mentioned before, after the closed bottom of the net 56 is brought onto the clipper 54, one end of the net 56 is taken and picked up over a rotated power block or drum 66 which is mounted on the end of a boom 68.

During the netting, net pick-up, brailing of the tuna and other phases, all operations are directed by a person in the crow's-nest 68 mounted to mast 70 of the clipper 54. While fishing operations are clearly visible from this vantage point, it is not possible to observe the action of sharks at any depth in the water. Although it is possible to start deploying a number of the cartridges 10 as soon as net holes appear during pickup of the net, in order to repel and deter further attacks on the netted tuna, a considerable amount of the tuna could be lost with attendant destruction of the net due to the well-known feeding frenzy of sharks. In this instance, a considerable number of the cartridges 10 must be deployed as fast as possible to prevent the sharks from doing much further damage. Thus, it is desirable that the cartridges 10 be deployed promptly with pickup of the net 56 and continued regularly until the net is formed into a relatively small bag or sack.

FIGURE 5 is another perspective of a simplified nature taken from another direction to illustrate the proper use of the cartridge 10 during pickup of the net 56. As the net 56 is being picked or taken up, the lower curved portion 72 is being constantly moved and in motion as indicated by arrow 74. The tuna 76 at or near this moving, lower portion 72 of the net 56 are easily gilled (dependent on their size), having their heads caught in the meshes of the net 56, and are rolled along with other, possibly dead tuna in the lower portion 72 of the net 56. Apparently, at about the time that the rolling strip, which is about 21 to 24½ fathoms down from the upper edge of the net 56, reaches and becomes the lower portion 72 of the net 56, a particularly attractive mass of gilled and rolling tuna 76 induces the sharks to attack at about that time.

By deploying the cartridges 10 in a generally circular scatter pattern before and during pick up of the net 56, a barrier of cloud formations 78 is produced to repel and deter the sharks from attacking the netted tuna. Proper deployment of the cartridges 10 is based upon experience, consideration of heavy running tides, etc. By utilizing cartridges 10 having a fuse 32 of proper length, and of correct sink rate, the cloud formations 78 will be produced at appropriate depths, as indicated, which would protect the catch from shark attack. It is to be noted that the cloud formations 78 not only provide a barrier which is repellent to the sharks, they are generally opaque and obscure the tuna at the lower portion 72 of the net 56. The sharks do not enter, except perhaps very rarely, an opaque area. The opaqueness of the cloud formations 78 is due in large measure to the fine sand in the chemical composition 28. A fairly large and opaque barrier can be created since each cartridge 10 produces a cloud formation of, for example, 24 cubic feet on initial detonation.

The cloud formations 78 at about rolling strip depth include copper sulfate or similar repellent in them if the chemical composition 28 in the cartridges 10 originally incorporated such ingredient, of course. However, any possible contamination of the nearby netted tuna and net is entirely removed over the distance both tuna and net must move to reach the clipper 54. Also, a relatively long time is involved before the netted tuna is brought to the bag, and finally scooped up and deposited in the fish wells 80 (FIGURE 4) of the clipper 54. Of course, if the toxic or disagreeable ingredient is omitted from the chemical composition 28 in the cartridge 10, there is no basis for any concern of contamination.

Actually, though, the cartridges 10 containing the amounts of the copper sulfate ingredient as given in EXAMPLE A above, may be used even within the net 56 without fear of any contamination to the tuna or net 56. There is, of course, no danger to a person or persons who are protected from shark attacks by exploded cartridges 10 which are filled with a chemical composition 28 as given in EXAMPLE D, although the cloud formations produced by it are extremely obnoxious to sharks. There is also no danger to any person from the explosions of the cartridges 10 if the amount of explosive charge 30 is suitably reduced for use in life saving or rescue operations, and the cartridges 10 are at least several feet away.

Although some specific dimensions, types of material, etc. have been given above for the illustrative example of my invention, it is to be understood that the particular embodiments of the invention described above and shown in the drawings is merely illustrative of and not restrictive on the broad invention, and that various changes in design, structure and arrangement may be made without departing from the spirit and scope of the appended claims.

I claim:

1. A predatory marine life repellent dispersal cartridge adapted to be manually energized and deployed comprising:
   a generally tubular casing including a first open end and a second open end;
   a ballast of a predetermined streamline shape and a specific gravity of the order of at least 2.80 secured to said first open end to close the same and to control substantially free gravitational sink rate of said cartridge in a fluid medium;
   a predetermined quantity of repellent material provided within said casing, said repellent material including a composition consisting of a mixture of a dye substance, and fine sand characterized by very finely divided particles which provide an opaque-forming and a respiratory-irritating substance carrying barrier against marine life upon dispersal of said repellent material;
   a predetermined size of explosive charge provided within said casing disposed generally centrally in said quantity of repellent material;
   ignition means including a fuse have a predetermined burn time, one end of said fuse being connected to said explosive charge;
   a cap having a port of a predetermined size therein secured to said second open end to close the same, said port being adapted to convey the other end of said fuse outside of said casing and is relatively small to limit the escape of gas generated by said fuse, when burning, to control the internal pressure in said cartridge so as to be in reasonable equilibrium with the external fluid pressure and prevent excessive compression of said casing and repellent material whereby sufficiently high external pressure with accompanying ingress of fluid would extinguish said fuse before detonation of said explosive charge;
   initiator means affixed to said cap about said port and including a predetermined amount of primer material provided about said port and embedding the other end of said fuse therein, for energizing the other end of said fuse conveyed outside of said casing after a predetermined burn time of said primer material whereby a predetermined time interval is provided for aiming and throwing said cartridge into the fluid medium after manual energization of said primer material and another predetermined time interval is provided for said cartridge to sink at the controlled sink rate in the fluid medium after said fuse is ignited by said primer material before said explosive charge is detonated to explode said casing and disperse said repellent material contained therein.

2. The invention as defined in claim 1 wherein said repellent material includes a composition consisting of a mixture of about two to about three parts by volume of sodium fluorescein, about four to about six parts by volume of very finely divided sand particles, and about two to about three parts by volume of finely powdered copper sulphate.

3. The invention as defined in claim 1 wherein said repellent material includes a composition consisting of a mixture of about one to about two parts by volume of sodium fluorescein, about four to about five parts by volume of very finely divided sand particles, and about three to about five parts by volume of creosote intimately and thoroughly mixed with said sodium fluorescein and said sand particles.

4. A predatory marine life repellent dispersal cartridge adapted to be manually energized and deployed, comprising:
   a generally tubular casing including a closed end of a predetermined streamline shape and an open end;
   a ballast of a specific gravity of the order of at least 2.80 and a predetermined weight located at said closed end for controlling substantially free gravitational sink rate of said cartridge in a fluid medium;
   a predetermined quantity of repellent material provided within said casing, said repellent material including a composition consisting of a mixture of a dye substance, and fine sand characterized by very finely divided particles which provide an opaque-forming and a respiratory-irritating substance carrying barrier against marine life upon dispersal of said repellent material;
   a predetermined size of explosive charge provided within said casing disposed approximately centrally in said quantity of repellent material;
   ignition means including a fuse having a predetermined burn time, one end of said fuse being connected to said explosive charge;
   a cap having a port of predetermined size therein secured the open end of said casing to close the open end thereof, said port being adapted to convey the other end of said fuse outside of said casing and is relatively small to limit the escape of gas generated by said fuse, when burning, to control the internal pressure in said cartridge so as to be in reasonable equilibrium with the external fluid pressure and prevent excessive compression of said casing and repellent material whereby sufficiently high external pressure with accompanying ingress of fluid would extinguish said fuse before detonation of said explosive charge;
   initiator means including a predetermined amount of primer material provided about said port and embedding the other end of said fuse therein, for energizing the other end of said fuse conveyed outside of said casing after a predetermined burn time of said primer material whereby a predetermined time interval is provided for aiming and throwing said cartridge into the fluid medium after manual energization of said primer material and another predetermined time interval is provided for said cartridge to sink at the controlled sink rate in the fluid medium after said fuse is ignited by said primer material before said explosive charge is detonated to explode said casing and disperse said repellent material contained therein.

5. The invention as defined in claim 4 wherein said repellent material includes a composition consisting of a mixture of about two to about three parts by volume of of sodium fluorescein, about four to about six parts by volume of very finely divided sand particles, and about two to about three parts by volume of finely powdered copper sulphate.

6. The invention as defined in claim 4 wherein said repellent material includes a composition consisting of a mixture of about one to about two parts by volume of sodium fluorescein, about four to about five parts by volume of very finely divided sand particles, and about three to about five parts by volume of creosote intimately and thoroughly mixed with said sodium fluorescein and said sand particles.

References Cited by the Examiner

UNITED STATES PATENTS

| | | | |
|---|---|---|---|
| 2,028,217 | 1/36 | Huffman | 102—39 |
| 2,170,815 | 8/39 | Eroe | 102—37.8 |
| 2,175,112 | 10/39 | Fischer | 102—39 |
| 2,468,394 | 4/49 | Dinsley | 167—13 |
| 2,470,358 | 5/49 | McKown | 102—70 |
| 2,810,229 | 10/57 | Allyn | 43—4.5 |
| 2,836,172 | 5/58 | Ginsburgh et al. | 102—37.8 |
| 2,859,695 | 11/58 | Rolle | 102—7 |
| 2,880,133 | 3/59 | Hasler | 167—46 |
| 3,005,280 | 10/61 | Vang | 43—4.5 |
| 3,069,798 | 12/62 | Puretic | 43—4.5 |

FOREIGN PATENTS 339,099   4/36   Italy.

SAMUEL FEINBERG, *Primary Examiner.*

SAMUEL W. ENGLE, *Examiner.*